United States Patent
Guo et al.

(10) Patent No.: US 11,704,556 B2
(45) Date of Patent: Jul. 18, 2023

(54) OPTIMIZATION METHODS FOR QUANTIZATION OF NEURAL NETWORK MODELS

(71) Applicant: Baidu USA LLC, Sunnyvale, CA (US)

(72) Inventors: Min Guo, San Diego, CA (US); Manjiang Zhang, Sunnyvale, CA (US); Shengjin Zhou, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 757 days.

(21) Appl. No.: 16/784,223

(22) Filed: Feb. 6, 2020

(65) Prior Publication Data
US 2021/0248456 A1    Aug. 12, 2021

(51) Int. Cl.
| | | |
|---|---|---|
| G06N 3/08 | (2023.01) | |
| G06N 3/04 | (2023.01) | |
| G06F 16/22 | (2019.01) | |

(52) U.S. Cl.
CPC ........... G06N 3/08 (2013.01); G06F 16/2219 (2019.01); G06N 3/04 (2013.01)

(58) Field of Classification Search
CPC .. G06N 3/04; G06N 3/08; G06N 5/04; G06N 20/00; G06F 16/2219
See application file for complete search history.

(56) References Cited

U.S. PATENT DOCUMENTS

| | | | |
|---|---|---|---|
| 2019/0012559 A1* | 1/2019 | Desappan | G06V 10/764 |
| 2020/0193270 A1* | 6/2020 | Wu | G06N 3/082 |
| 2020/0257966 A1* | 8/2020 | Dumoulin | G06F 11/3466 |

OTHER PUBLICATIONS

Krishnamoorthi (Quantizing deep convolutional networks for efficient inference: A whitepaper), pp. 1-36 . . . (Year: 2018).*

* cited by examiner

*Primary Examiner* — Daniel G Mariam
(74) *Attorney, Agent, or Firm* — Womble Bond Dickinson (US) LLP (57) ABSTRACT

Embodiments relate to systems and methods to optimize quantization of tensors of an AI model. According to one embodiment, a system receives an AI model having one or more layers. The system receives a number of input data for offline inferencing and applies offline inferencing to the AI model based on the input data to generate offline data distributions for the AI model. The system quantizes one or more tensors of the AI model based on the offline data distributions to generate a low-bit representation AI model, where each layer of the AI model includes the one or more tensors, where the one or more tensors include the one or more tensors. In one embodiment, the system applies online inferencing using the low-bit representation AI model to generate online data distributions for a feature map, and quantizes a feature map tensor based on the online data distributions.

20 Claims, 9 Drawing Sheets

OPTIMIZATION METHODS FOR QUANTIZATION OF NEURAL NETWORK MODELS

TECHNICAL FIELD

Embodiments of the present disclosure relate generally to machine-learning model training and inference. More particularly, embodiments of the disclosure relate to optimization methods for quantization of neural network models.

BACKGROUND

Quantization refers to the process of reducing the number of bits that represent a number. In the context of artificial intelligence (AI) machine learning models, the predominant numerical format used is 32-bit floating point, or FP32. AI models with lower bit-depth is faster as operations with 32-bit floating point will almost always be slower than 8-bit or 16-bit integers. Moreover, optimizing an AI model from 32-bits to 8/16-bits reduces memory utilization in the orders of 2-4 times. An optimized AI model requires less storage space, and are easier to load or update. An optimized AI model also utilizes less caches/registers space. Thus, a lower bid-width is desirable for AI models.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to systems and methods for optimization methods to quantize weights, activations, and/or feature maps tensors of a trained AI NN model to a low-point precision representation. The trained AI NN model can be a supervised or an unsupervised AI model. The AI NN model can be, but is not limited to, a deep neural network model, a single or multi-layer perceptron, a convolutional NN model, a long short term memory (LSTM) model, a recurrent NN model, or a reinforcement learning AI model, etc.

The tensors quantization can be performed by a data processing system, a central processing unit (CPU), a graphical processing unit (GPU), a general processing unit, or a data processing accelerator. In one embodiment, the quantization can be performed by a data processing accelerator having an array of processing elements in a pipelined architecture. Note, a tensor is a n-dimensional matrix, where n is any natural number, e.g., 0, 1, 2, 3, etc.

According to one embodiment, a system receives a trained AI model having one or more layers. The system receives a number of input data for offline inferencing. The system applies offline inferencing to the trained AI model based on the plurality of input data to generate offline data distributions for the trained AI model. The system quantizes one or more tensors of the trained AI model based on the offline data distributions to generate a low-bit representation AI model, where each layer of the AI model includes the one or more tensors, where the one or more tensors include activation, weights, or bias tensors.

In one embodiment, the system applies online inferencing using the low-bit representation AI model to generate online data distributions for a feature map, and quantizes a feature map tensor based on the online data distributions.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

Figure 1:
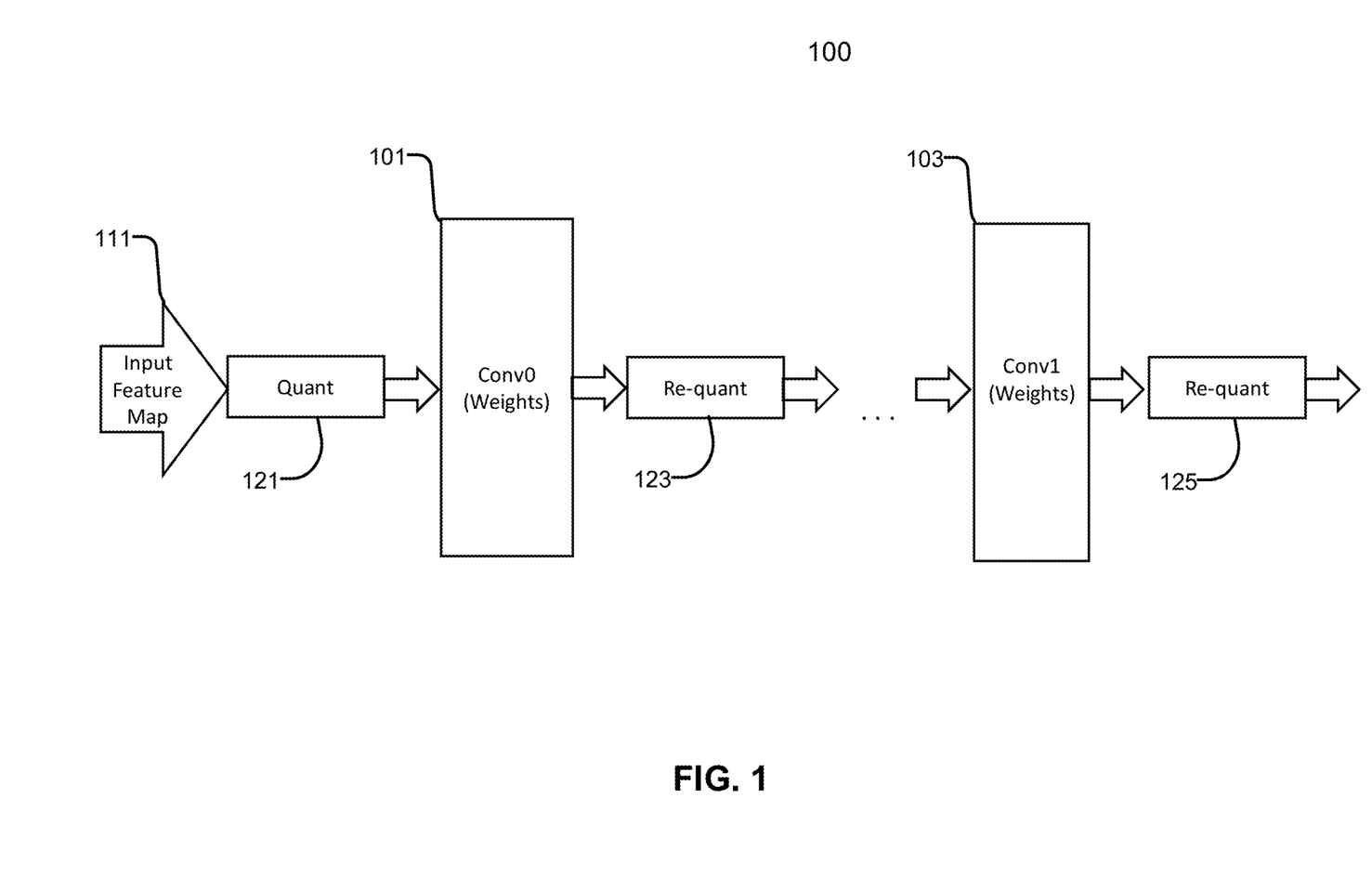
FIG. 1 is a block diagram illustrating an example quantization of a convolutional neural network model according to one embodiment.

FIG. 1 is a block diagram illustrating an example quantization of a convolutional neural network model according to one embodiment. Referring to FIG. 1, model 100 includes a convolutional neural network model having one or more layers 101-103. Each of the layers can have one or more kernels or matrices or tensors of weights, bias, and/or activations, which, when multiplied with an input feature map, generates an output feature map.

For an inference, the model 100 is applied to input feature map 111, where input feature map 111 is quantized. The output of each layer of model 100 is quantized layer-by-layer by quantizers 121-125. Although a convolutional neural network model is shown, model 100 may be any AI models with any number of layers/channels.

Figure 2:
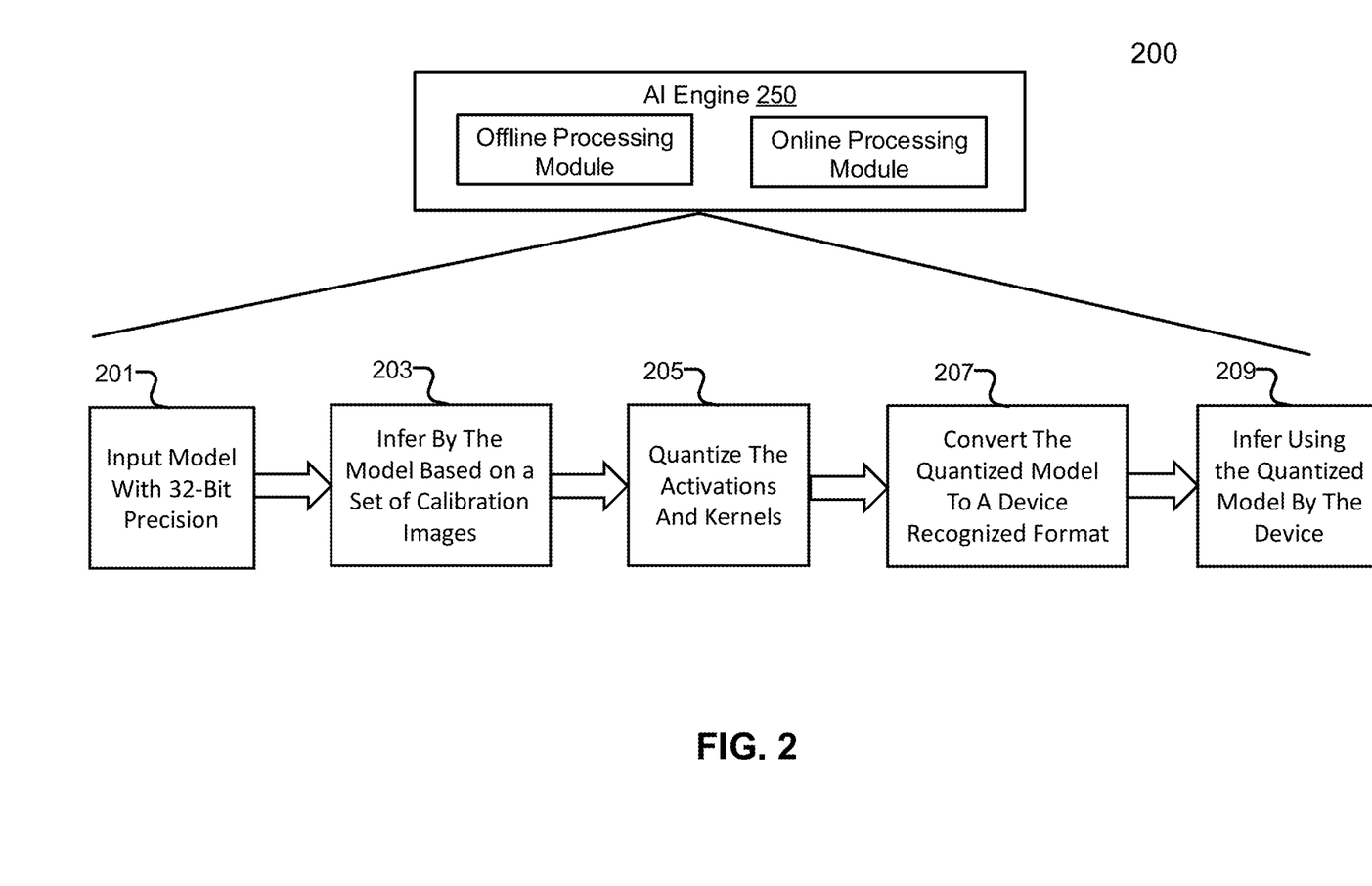
FIG. 2 is a block diagram illustrating an example of offline operations to quantize an AI model according to one embodiment.

FIG. 2 is a block diagram illustrating an example of offline operations to quantize an AI model according to one embodiment. Operations 200 can be performed by an AI engine 250, or an accelerator, such as accelerator 800 of FIG. 8, or a data processing system. Referring to FIG. 2, at operation 201, processing logic receives an AI model with a single precision floating point formats, e.g., 32 bits or FP32. FP32 is a number format that can represent an enormous range of values with a high degree of mathematical precision occupying 32 bits in computer memory. The AI model can also have a higher bit-width such as 64 bits, 128 bits, etc. At operation 203, the model will inference with enough images to generate one or more data distributions for each of the layers of the AI model. In one embodiment, based on the data distributions, processing logic removes the outlier value and receives the floating point min and max values (e.g., float_min and float_max) for each activation.

Processing logic, at operation 205, quantizes the feature map, kernel weights, and bias tensors based on the float_min and float_max of each tensor to generate the per channel scale and zero points for these tensors. Processing logic quantizes the tensors by calculating per channel scale (e.g., $St=Sw*Sm/Sz$), and offset (e.g., $Zz+St*Zw*Zm-St*Qw*Zm$), where Sw is a weight scale=$(Fmax-Fmin)/255$, Sm is a feature map scale for the m-th layer, $Sz=Sm+1$ is a feature map scale for the (m+1)th layer, Zz is a zero-point or bias point for feature map for the (m+1)th layer, Zw—zero-point weight, Zm is zero-point or bias for feature map for the m-th layer, and Qw is a quantization weight. Here Qz and Qm are variable, e.g., Qz and Qm changes depending on the inputs of each layer. The tensor quantization can be further divided into offline processing and online processing operations. These operations are further described below.

At operation 207, the quantized information is converted into a device-recognizable format. E.g., the calculated information is stored as a model blob. At operation 209, the model blob can be deployed and used by a device for inference. Note that AI engine 250 can include offline processing module and online processing module. AI engine 250 can be implemented as part of an accelerator, such as NN processing core 801 of accelerator 800 of FIG. 8, or as part of a data processing system or an edge device.

Figure 3:
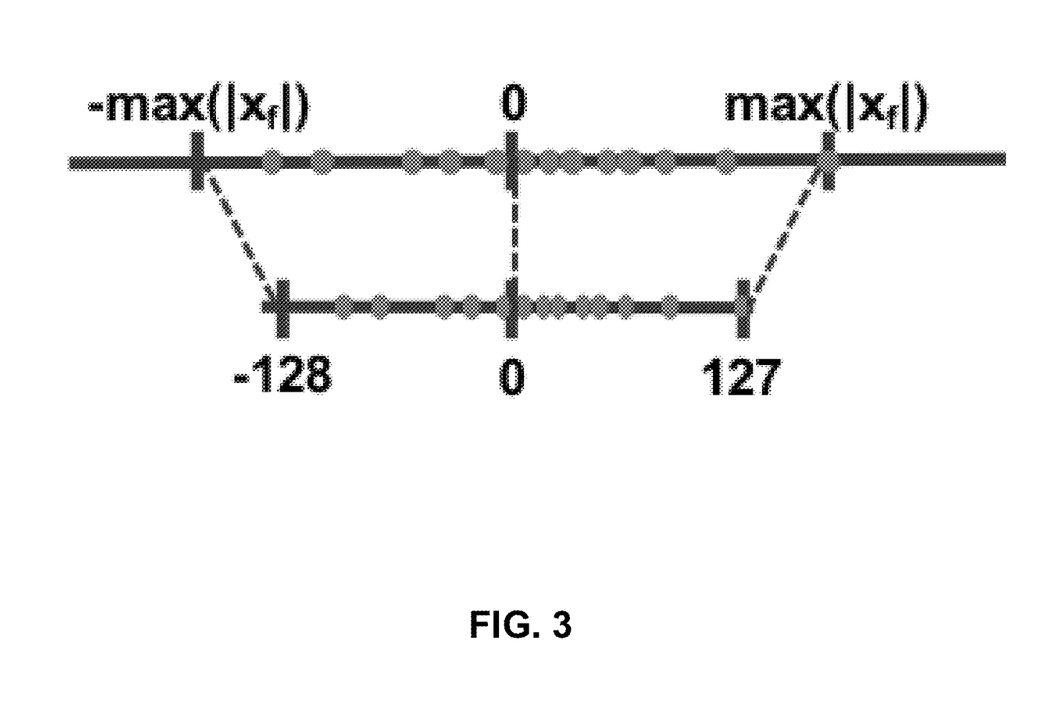
FIG. 3 is a block diagram illustrating a symmetric mode of quantization according to one embodiment.

FIG. 3 is a block diagram illustrating a symmetric mode of quantization according to one embodiment. Referring to FIG. 3, a floating point value is quantized into an 8-bit integer or other representation in a symmetric mode. The floating point values can be a weight, a bias, an activation function value, or any floating point value as part of an AI model to be quantized. Here, an 8-bit representation can store 0-255 values, or −128 to 127. The symmetry mode picks a largest value of the two extremities, e.g., the largest of the absolute value of the min and the max of the floating point values, e.g., Xf. In a symmetric mode, there is no zero-point value (or bias) so the floating-point range to be quantized, and the 8-bit quantized representation is symmetric with respect to zero.

The equation for the quantized value x in a symmetric mode is:

$$Qx=\text{round}(scale*x),$$

where Qx is the quantized representation of x, scale is $128/(\max(-|Xf|, |Xf|)$, round is a rounding function rounding to the nearest integer, x is the value to be quantized, and Xf is $\max(\text{abs}(\text{float\_min}), \text{abs}(\text{float\_max}))$.

As described in FIG. 2, in one embodiment, the weight, bias, activation function floating point quantization is performed offline. Here, the floating point ranges for each layer of an AI model can be predetermined and the tensors quantized according to offline data distributions derived from inferring a large set of input samples offline. However, the feature maps of each layer may have variable ranges during online inferencing. Thus, in one embodiment, the feature map tensors are quantized online, where the quantization can be represented by:

$$Qm+1=(Sw*Sm/Sm+1)*Qw*Qm,$$

$$Qm+1=St*Qw*Qm,$$

where $St=Sw*Sm/Sm+1$, Sm is a feature map scale for the m-th layer, Sm+1 is a feature map scale for the (m+1)th layer, Sw is a weight scale, Qw is a quantized weight, Qm is a quantized feature map for the m-th layer. Here, St and Qw are known and are calculated offline for all the layers. Note, offline inferencing refers to inferencing using an AI model before quantization, such as an AI model having a single precision floating point format, based on a set of sample inputs to determine the quantization weights, activation functions, and/or biases tensors for the AI models. Online inferencing refers to live inferencing using an AI model with quantized weights, activation functions, and/or biases tensors. Online inferencing can determine the quantization of feature map tensors.

Based on the quantized tensors, the AI model can be represented by a low-bit (e.g., 8-bit) representation. For the symmetric mode, if a system does not select a correct max value, or the distribution of the model values is heavily leaned to one side, e.g., not uniformly distribution between float_min and float_max, then the quantization error may be high for the AI model.

Figure 4:
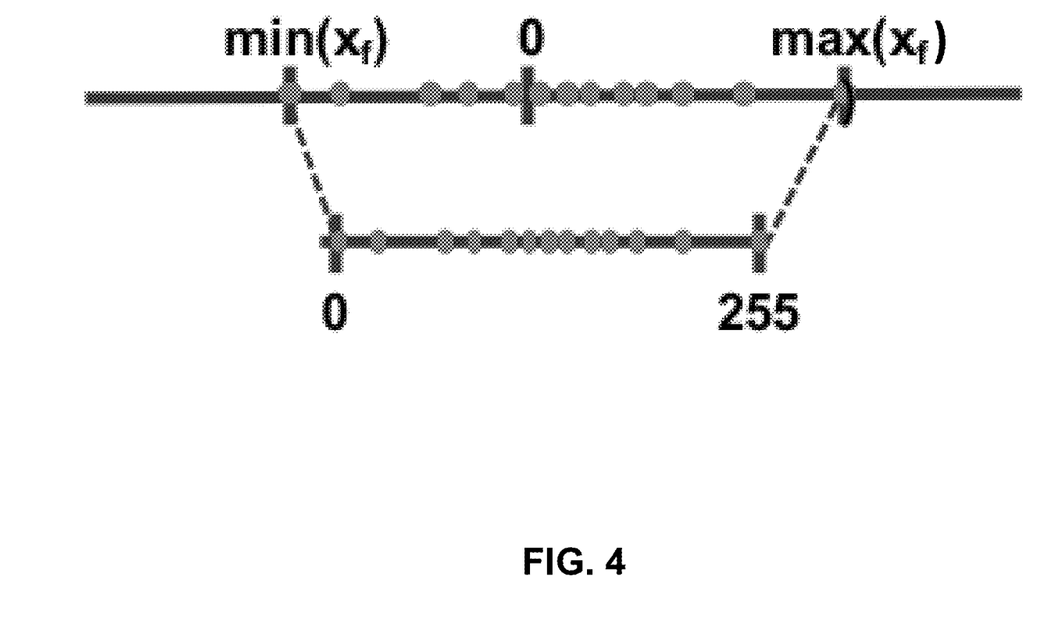
FIG. 4 is a block diagram illustrating an asymmetric mode of quantization according to one embodiment.

FIG. 4 is a block diagram illustrating an asymmetric mode of quantization according to one embodiment. Referring to FIG. 4, a floating point value is quantized into an 8-bit representation in an asymmetric mode. For an asymmetric mode, the min and max of the float range (float_min, float_max) is mapped to the min/max of the quantization integer range 0 to 255. A zero-point (or quantization bias, or offset) is used in addition to a scale factor.

The equation for the quantized value in an asymmetric mode for x can be:

$$Qx=\text{round}((x-\text{float\_min})*128/\text{range})=\text{round}(scale*x-\text{zero\_point}),$$

where Qx is the quantized representation of x, scale is scale factor=$128/\text{range}$, zero_point is float_min*128/range, and range=float_max−float_min.

As described in FIG. 2, in one embodiment, the weight, bias, activation function tensors quantization can be performed offline. Here, the floating point ranges for the AI model, and/or each layer of an AI model can be determined using offline data distributions and the tensors quantized based on the offline data distributions, where the offline data distributions is derived by inferencing based on a large set of input samples offline. However, the feature maps of each layer have variable ranges. Thus, in one embodiment, the feature map tensors are quantized online, or calculated during inferencing, where the quantization equation is represented by:

$$Qz=Zz+(Sw*Sm/Sz)*(Qw-Zw)*(Qm-Zm),$$

$$Qz=Zz+St*(Qw-Zw)*(Qm-Zm),$$

$$Qz=(Zz+St*Zw*Zm-St*Qw*Zm)+St*(Qw-Zw)*Qm,$$

$$Qm+1=\text{Offset}+St*(Qw-Zw)*Qm,$$

where $Offset=Zz+St*Zw*Zm-St*Qw*Zm$, $St=Sw*Sm/Sz$, Sw is a weight scale=(float_max−float_min)/255, Sm is a feature map scale for the m-th layer, $Sz=Sm+1$ is a feature map scale for the (m+1)th layer, Zw is a zero-point weight value, Zm is zero-point or bias for feature map for the m-th layer, Zz is a zero-point or bias point for feature map for the (m+1)th layer, Qw is a quantization of a weight value, Qm is a quantization feature map value for the m-th layer, and Qz is a quantization feature map value for the (m+1)th layer. Note that St, Offset, and Zw are calculated for all the layers by offline inferencing.

In one embodiment, the scales, zero-point or bias values, and quantization values are performed per channel of the AI model. For example, a CNN model with three color channels (Red-Blue-Green channels) can have three separate sets of scales, zero-point or bias values, and quantization values for the three color channels. Although a CNN model is used for the purpose of illustration, the quantization can be applied for other types of AI model having one or more channels.

Note that Qz and Qm are variable values for each layer and a variable value changes depending on each feature map input of the layer. Qz and Qm are thus calculated during online inferencing.

Figure 5:
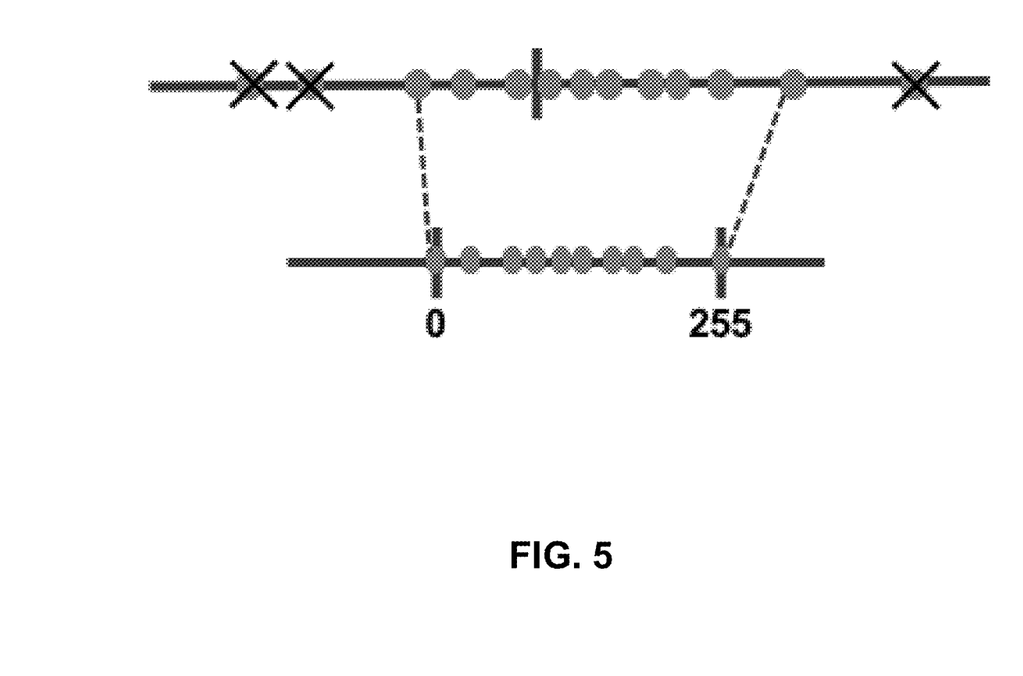
FIG. 5 is a block diagram illustrating removals of outliers for quantization according to one embodiment.

FIG. 5 is a block diagram illustrating removals of outliers for quantization according to one embodiment. In some cases, the float range (e.g., float_min and float_max) of any of the tensors of the AI model contains outliers. Using the outlier values to quantize the tensors increases a loss of precision or distortion. In one embodiment, referring to FIG. 5, a predetermined number of outliers are eliminated from the dynamic range (e.g., float_min and float_max). In one embodiment, two outliers are removed from extremities of either side of the quantization range prior to determining the quantization range.

Figure 6:
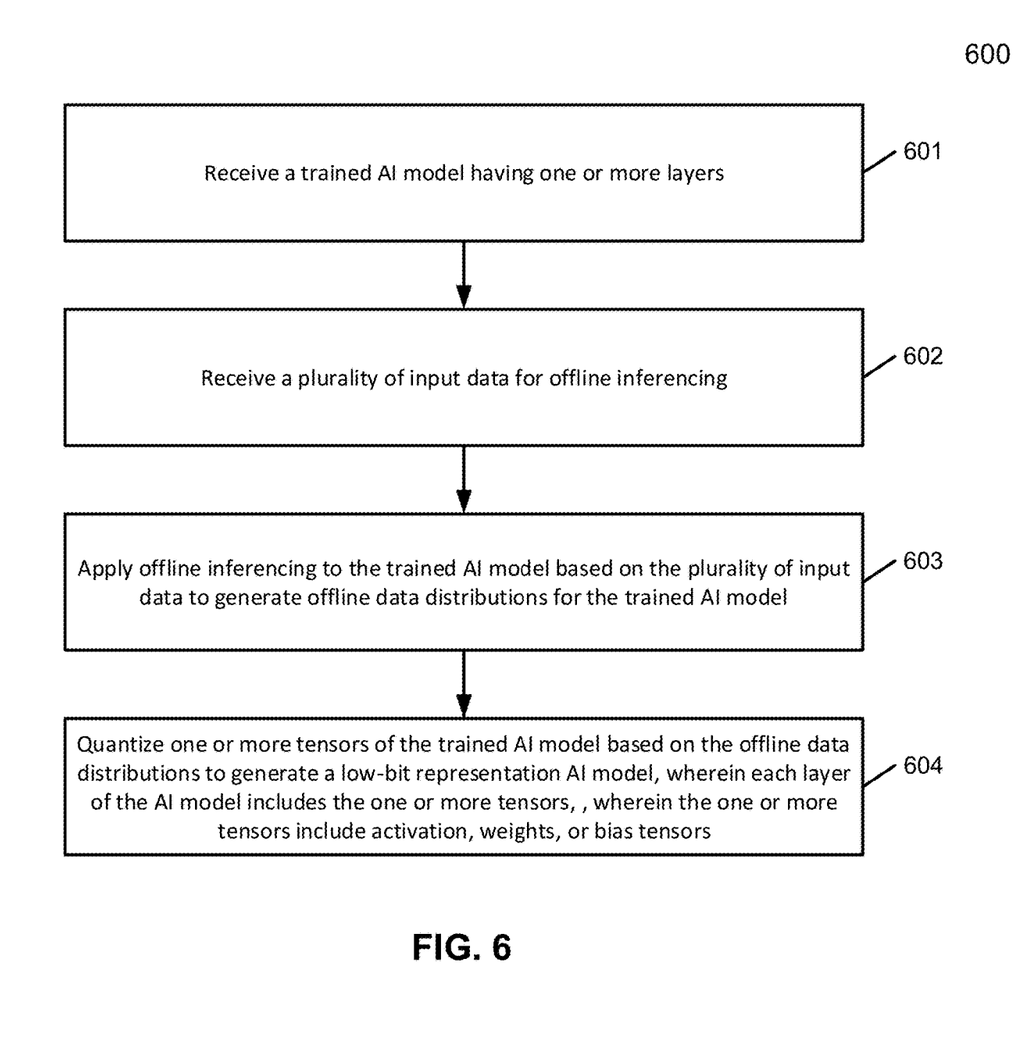
FIG. 6 is a flow diagram illustrating a quantization method according to one embodiment.

FIG. 6 is a flow diagram illustrating a quantization method according to one embodiment. Process 600 may be performed by processing logic which may include software, hardware, or a combination thereof. For example, process 600 may be performed by an AI engine 250 of FIG. 2, or accelerator 800 of FIG. 8, or a host system. Referring to FIG. 6, at block 601, processing logic receives a trained AI model having one or more layers. At block 602, processing logic receives a number of input data for offline inferencing. At block 603, processing logic applies offline inferencing to the trained AI model based on the input data to generate offline data distributions for the trained AI model. At block 604, processing logic quantizes one or more tensors of the trained AI model based on the offline data distributions to generate a low-bit representation AI model, where each layer of the AI model includes the one or more tensors, where the one or more tensors include activation, weights, or bias tensors.

Figure 7:
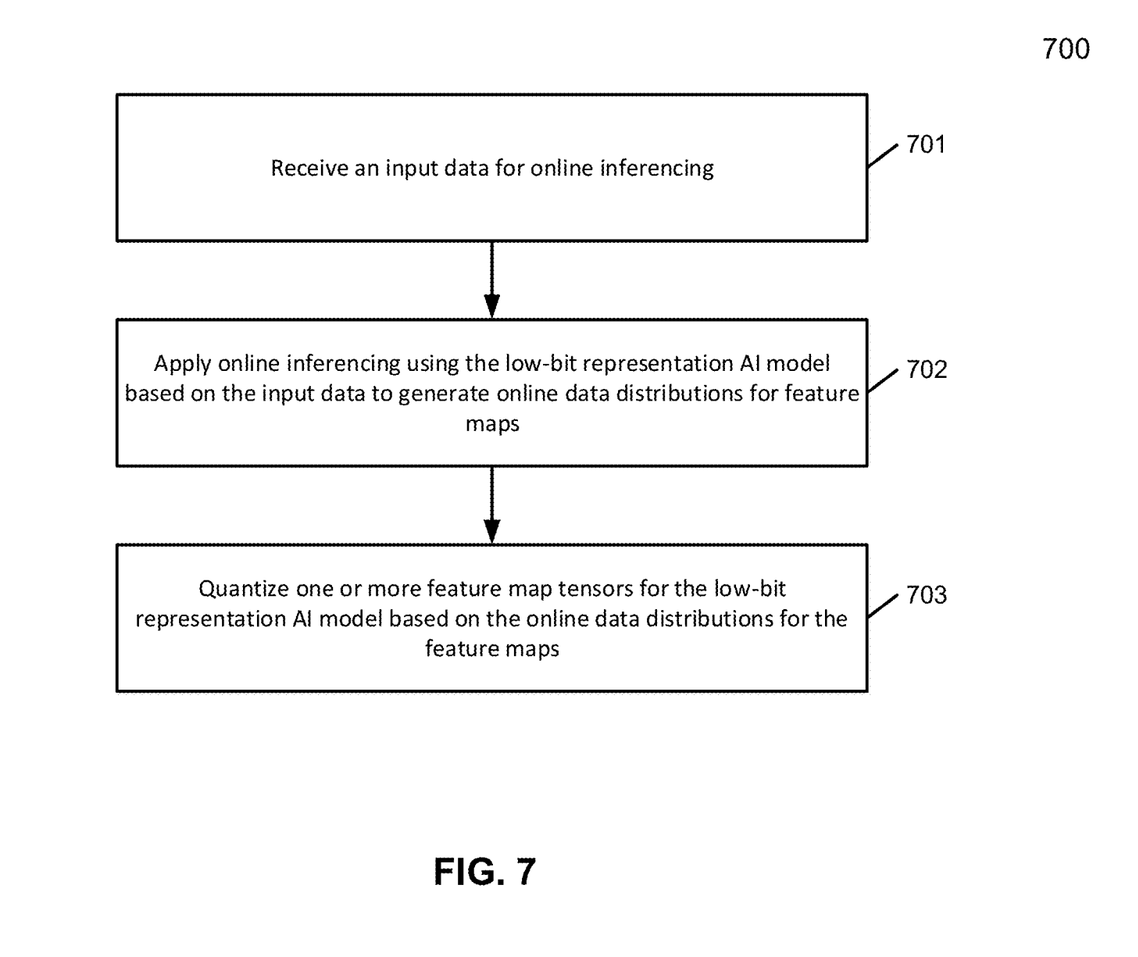
FIG. 7 is a flow diagram illustrating a quantization method according to one embodiment.

FIG. 7 is a flow diagram illustrating a quantization method according to one embodiment. Process 700 may be performed by processing logic which may include software, hardware, or a combination thereof. For example, process 700 may be performed by an AI engine 250 of FIG. 2, or accelerator 800 of FIG. 8, or a host system. Referring to FIG. 7, at block 701, processing logic receives an input data for online inferencing. At block 702, processing logic applies online inferencing using the low-bit representation AI model based on the input data to generate online data distributions for feature maps. At block 703, processing logic quantizes one or more feature map tensors for the low-bit representation AI model based on the online data distributions for the feature maps.

In one embodiment, a feature map tensor is quantized for each of the one or more layers of the low-bit representation AI model. In one embodiment, the one or more feature map tensors are quantized by a two dimensional array of processing elements. In one embodiment, one of the one or more tensors includes an 8-bit integer representation. In one embodiment, one of the tensors are symmetrically quantized for a range for a data distribution corresponding to the tensor based on a scale factor for the range.

In one embodiment, one of the tensors are asymmetrically quantized for a range for a data distribution corresponding to the tensor based on an offset and a scale factor for the asymmetrically range. In one embodiment, processing logic further identifies outlier points in the generated data distributions and removes a predetermined number of the identified outlier points.

In one embodiment, the input data includes one or more channels and the data distributions are generated for each of the one or more channels and the one or more tensors are quantized on a per-channel basis. In one embodiment, the one or more tensors of the trained AI model are quantized offline and the quantized tensor information is stored as a model blob.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
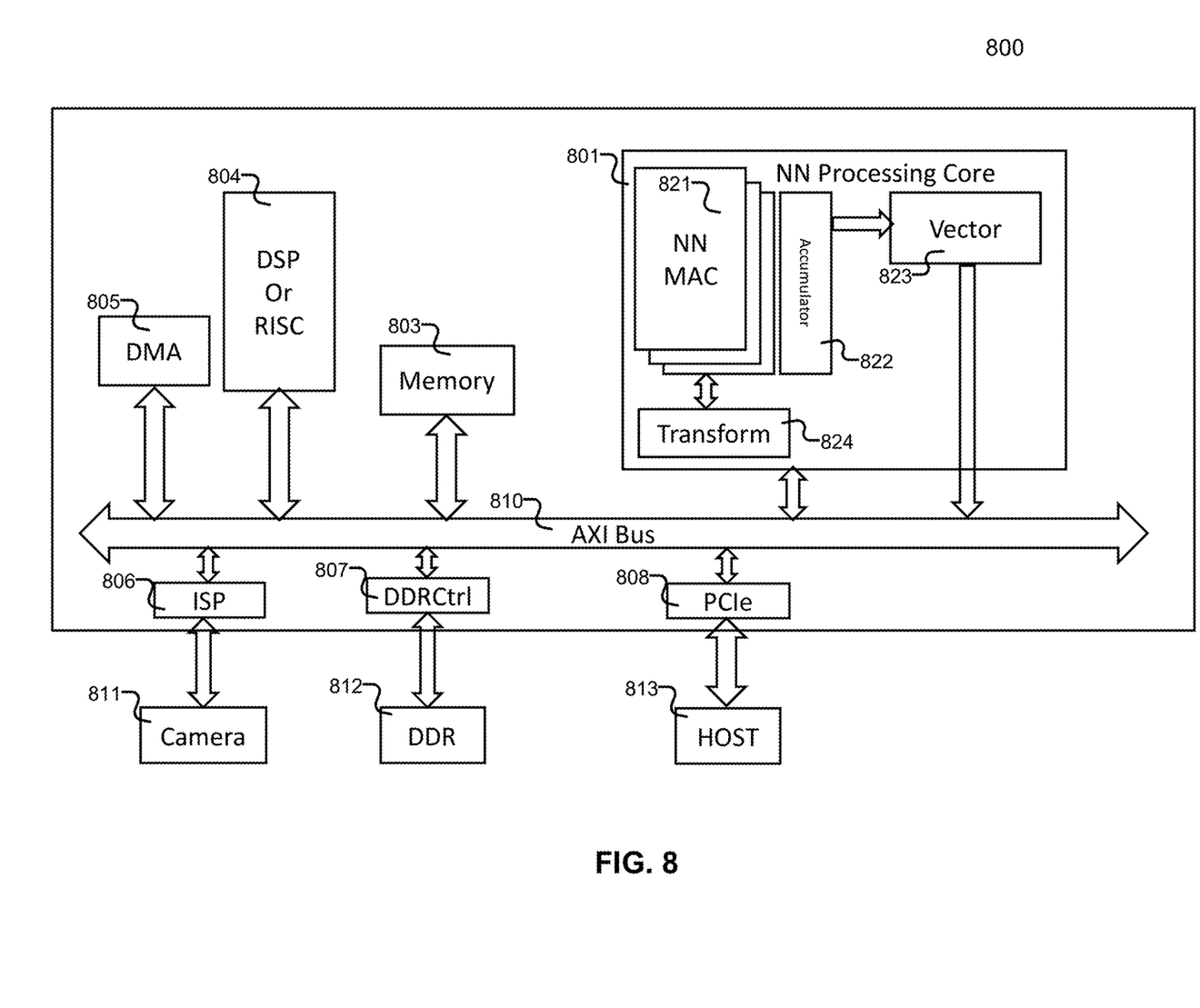
FIG. 8 is a block diagram illustrating a data processing accelerator unit according to one embodiment.

FIG. 8 is a block diagram illustrating a data processing accelerator unit according to one embodiment, which may be used with one embodiment of the invention. For example, accelerator 800 may perform any of the processes or methods described above, such as, for example, processes 600 and 700 described above.

Accelerator 800 can include many different components. These components can be implemented as integrated circuits (ICs), portions thereof, discrete electronic devices, or other modules adapted to a circuit board such as a PCIE board or add-in card of a computer system, or as components otherwise incorporated within a chassis of a computer system.

In one embodiment, accelerator 800 includes processing core 801 and memory 803 via a bus or an interconnect 810. In one embodiment, bus 810 includes an advanced extensible interface (AXI) bus using an AXI protocol. Processing core 801 may represent a single processor or multiple processors with a single processor core or multiple processor cores included therein. Processing core 801 may represent one or more general-purpose processors such as a microprocessor, a central processing unit (CPU), a graphic processing unit (GPU), an accelerator unit, or the like. In one embodiment, processing core 801 represents an AI engine, such as AI engine 250 of FIG. 2. In one embodiment, processing core 801 includes one or more multiply-accumulate units (MAC) 821, accumulators 822, vector engine 823, and transform engine 824 to manipulate tensors.

Multiply-accumulate units (MAC) 821 can perform multiplication and accumulation processing. Accumulators 822 can store results for the MAC 821. Vector engine 823 can perform vector (one dimensional arrays of data) operations to generate results based on data of accumulators 822. Transform engine 824 can perform a transformation to a tensor. A result of vector engine 823 can be fed to MAC 821 for a next clock cycle.

In one embodiment, accelerator 800 includes a digital signal processor (DSP) or a reduced instruction set computing (RISC) microprocessor 804, dynamic memory access (DMA) 805, image signal processor (ISP) 806, DDR controller (DDRCtrl) 807, and peripheral component interconnect express (PCIE) 808.

Accelerator 800 may be configured to execute instructions for performing all or portions of the operations and steps discussed herein. Accelerator 800 may communicate with memory 803, which in one embodiment can be implemented via multiple memory devices to provide for a given amount of accelerator memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processing core 801, or any other device.

Accelerator 800 may further include camera devices 811 to capture images for ISP 806, DDR memory 812 coupled to DDR controller 807 for communication with the DDR controller 807. Accelerator 800 in one embodiment is coupled to host 813 through PCIE 808. Host 813 can be any data processing system.

Figure 9:
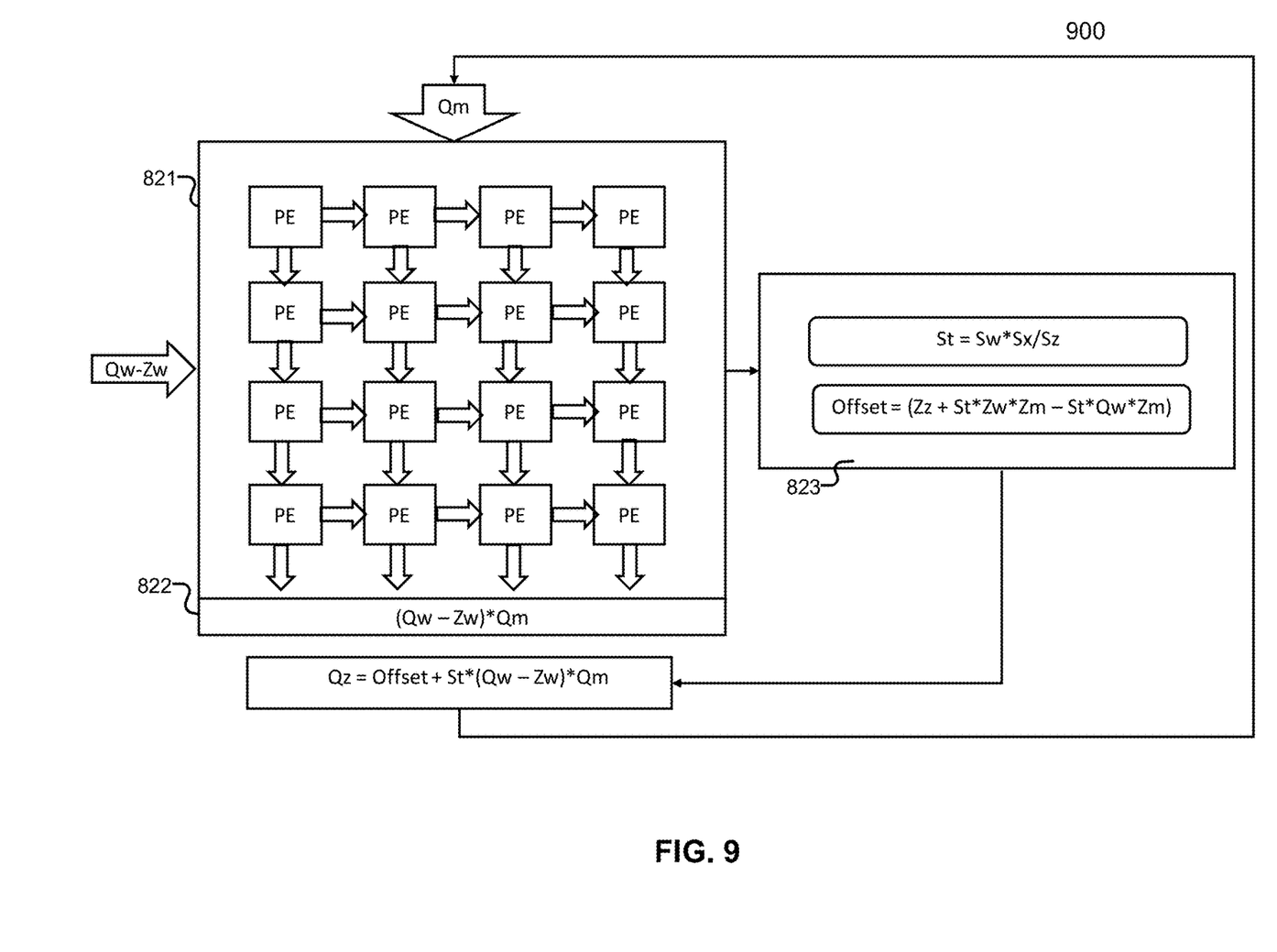
FIG. 9 is a block diagram illustrating quantization using a neural network processing core according to one embodiment.

FIG. 9 is a block diagram illustrating quantization using a neural network processing core according to one embodiment. Core 900 may be implemented as a software or a hardware module. Core 900 may represent NN processing core 801 of FIG. 8 or AI engine 250 of FIG. 2. Referring to FIG. 9, core 900 includes MAC 821 as a two dimensional array of processing elements (PE) 901. Each PE 901 can perform multiplication and accumulation operations, e.g., Qm*(Qw−Zw). PE 901 may be a systolic array having a N×N dimension, where N equals to or greater than the number of layers of an AI model. Here, systolic array can efficiently perform multiplications and accumulations. Data can flow between PE cells in a pipelined fashion such that loading/storing intermediate results are not necessary. For example, Qm inputs at the top of PE 901, while (Qw−Zw) inputs at the left of PE 901. For each clock cycle, data flows in a direction (e.g., left to right and/or top to bottom) and results are calculated based on the data input at each PE. In one embodiment, each of the Qm and (Qw-Zw) flows at each clock cycle, so that Qw and Zw corresponding to a layer is applied to the Qm of that layer to generate an intermediate result (e.g., intermediate_result=(Qw−Zw)*Qm). Intermediate results of the PE elements are stored at accumulators 822. Vector engine 823 can then perform vector accumulation (e.g., Offset+St*intermediate_result) based on the data at accumulators 822. A result of vector engine 823 (e.g., Qm+1) can be fed to MAC 821 for a next clock cycle. As shown, after some clock cycles, the Qm for each of the layers can be calculated by PE 901. Note that FIG. 9 only shows one cycle of results for the purpose of illustration. Note that other multiply-accumulate implementations are feasible. For example, data flow for Qw and Zw may be stationary if Qw and Zw are the same for each layer of the AI model.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:
receiving, by at least one processor, a trained artificial intelligence (AI) model having one or more layers;
receiving, by the at least one processor, first input data for offline inferencing;
applying, by the at least one processor, offline inferencing to the trained AI model based on the first input data to generate offline data distributions for the trained AI model;
identifying outlier points in the offline data distributions;
removing a predetermined number of the identified outlier points to generate an updated offline data distributions; and quantizing, by the at least one processor, one or more tensors of the trained AI model based on the updated offline data distributions to generate a low-bit representation AI model, wherein each layer of the AI model includes the one or more tensors, wherein the one or more tensors include activation, weights, or bias tensors.

2. The method of claim 1, further comprising:
receiving second input data for online inferencing;
applying online inferencing using the low-bit representation AI model based on the second input data to generate online data distributions for feature maps; and
quantizing one or more feature map tensors for the low-bit representation AI model based on the online data distributions for the feature maps.

3. The method of claim 2, wherein a feature map tensor is quantized for each of the one or more layers of the low-bit representation AI model.

4. The method of claim 2, wherein the one or more feature map tensors are quantized by a two dimensional array of processing elements.

5. The method of claim 1, wherein at least one of the one or more tensors includes an 8-bit representation.

6. The method of claim 1, wherein at least one of the tensors is symmetrically quantized for a range for a data distribution corresponding to the tensor based on a scale factor for the range.

7. The method of claim 1, wherein at least one of the tensors is asymmetrically quantized for a range for a data distribution corresponding to the tensor based on an offset and a scale factor for the asymmetrically range.

8. The method of claim 1, wherein the first input data includes one or more channels and the updated offline data distributions are generated for each of the one or more channels and the one or more tensors are quantized on a per-channel basis.

9. The method of claim 1, wherein the one or more tensors of the trained AI model are quantized offline and information for the quantized tensor is stored as a model blob.

10. The method of claim 1, wherein the first input data comprises a plurality of offline input images that are representative of but are different from images used for online inferencing.

11. A data processing system, comprising:
one or more processors; and
a memory coupled to the one or more processors to store instructions, which when executed by the one or more processors, cause the one or more processors to perform operations, the operations including
receiving a trained artificial intelligence (AI) model having one or more layers;
receiving first input data for offline inferencing;
applying offline inferencing to the trained AI model based on the first input data to generate offline data distributions for the trained AI model;
identifying outlier points in the offline data distributions;
removing a predetermined number of the identified outlier points to generate an updated offline data distributions; and
quantizing one or more tensors of the trained AI model based on the updated offline data distributions to generate a low-bit representation AI model, wherein each layer of the AI model includes the one or more tensors, wherein the one or more tensors include activation, weights, or bias tensors.

12. The system of claim 11, wherein the operations further comprise:
receiving second input data for online inferencing;
applying online inferencing using the low-bit representation AI model based on the second input data to generate online data distributions for feature maps; and
quantizing one or more feature map tensors for the low-bit representation AI model based on the online data distributions for the feature maps.

13. The system of claim 12, wherein a feature map tensor is quantized for each of the one or more layers of the low-bit representation AI model.

14. The system of claim 12, wherein the one or more feature map tensors are quantized by a two dimensional array of processing elements.

15. The system of claim 11, wherein at least one of the one or more tensors includes an 8-bit integer representation.

16. A non-transitory machine-readable medium having instructions stored therein, which when executed by one or more processors, cause the one or more processors to perform operations, the operations comprising:
receiving a trained artificial intelligence (AI) model having one or more layers;
receiving first input data for offline inferencing;
applying offline inferencing to the trained AI model based on the first input data to generate offline data distributions for the trained AI model;
identifying outlier points in the offline data distributions;
removing a predetermined number of the identified outlier points to generate an updated offline data distributions; and
quantizing one or more tensors of the trained AI model based on the updated offline data distributions to generate a low-bit representation AI model, wherein each layer of the AI model includes the one or more tensors, wherein the one or more tensors include activation, weights, or bias tensors.

17. The non-transitory machine-readable medium of claim 16, wherein the operations further comprise:
receiving second input data for online inferencing;
applying online inferencing using the low-bit representation AI model based on the second input data to generate online data distributions for feature maps; and
quantizing one or more feature map tensors for the low-bit representation AI model based on the online data distributions for the feature maps.

18. The non-transitory machine-readable medium of claim 17, wherein a feature map tensor is quantized for each of the one or more layers of the low-bit representation AI model.

19. The non-transitory machine-readable medium of claim 17, wherein the one or more feature map tensors are quantized by a two dimensional array of processing elements.

20. The non-transitory machine-readable medium of claim 16, wherein at least one of the one or more tensors includes an 8-bit integer representation.

* * * * *